United States Patent [19]

Kofoed, Sr.

[11] Patent Number: 4,465,288
[45] Date of Patent: Aug. 14, 1984

[54] SEALING APPARATUS INCLUDING PLIABLE CABLE WRAPPING WITH UPPER AND LOWER SEAL MEANS

[76] Inventor: Robert M. Kofoed, Sr., 10 Oldfield Pl., Red Bank, N.J. 07701

[21] Appl. No.: 504,682

[22] Filed: Jun. 16, 1983

Related U.S. Application Data

[63] Continuation-in-part of Ser. No. 430,785, Sep. 30, 1982, abandoned.

[51] Int. Cl.³ .......................... F16J 15/02; A62C 7/00
[52] U.S. Cl. ........................................ 277/237 R; 277/1;
277/186; 277/212 FB; 277/22; 174/48; 248/56;
52/221; 169/48; 24/204
[58] Field of Search .................... 277/1, 237, 181, 186,
277/212 FB, 22; 169/48; 174/48; 248/56;
52/221; 24/204, 205 R

[56] References Cited

U.S. PATENT DOCUMENTS

| 2,718,225 | 9/1955 | Wallin .............................. 277/181 X |
| 2,813,692 | 11/1957 | Bremer et al. ....................... 1248/56 |
| 3,503,101 | 3/1970 | Kolozsvary ........................... 24/204 |
| 3,696,472 | 10/1972 | Perina et al. ....................... 24/205 R |
| 4,086,736 | 5/1978 | Landrigan ......................... 248/56 X |

FOREIGN PATENT DOCUMENTS

| 2162251 | 6/1973 | Fed. Rep. of Germany ........ 169/48 |
| 2627447 | 12/1977 | Fed. Rep. of Germany ........ 174/48 |
| 2010988 | 7/1979 | United Kingdom ......... 277/212 FB |
| 2028390 | 3/1980 | United Kingdom .................. 277/22 |
| 2070927 | 9/1981 | United Kingdom .................. 277/22 |

Primary Examiner—Robert S. Ward
Attorney, Agent, or Firm—R. Gale Rhodes, Jr.; R. Gale Rhodes, Jr.

[57] ABSTRACT

Sealing apparatus including a body of pliable material for being wrapped around a portion of a longitudinally extending member, such as for example a computer cable or cables, extending through an opening formed in a member, such as for example an opening formed in a raised floor of a computer equipment room, and further including a drawstring and an expansion ring complementary in shape to the shape of the opening, the body of pliable material is provided with a passageway along its lower portion for receiving the ring and provided with a plurality of holes along its upper portion for receiving the drawstring, upon the drawstring and ring being placed respectively in the plurality of holes and passageway, the ring is compressed inwardly to permit the lower portion of the pliable material provided with the passageway and the ring to be inserted into the opening and upon the ring expanding outwardly it wedges the lower portion of the material against the surface providing the opening providing a seal therebetween and upon the drawstring being drawn tightly and tied against the longitudinal member, the upper portion of the pliable material is sealed against the member and the environments on either side of the member in which the opening is formed and through which the longitudinal member extends are sealed off from each other. The body of pliable material may be made of a suitable flame spread barrier material thereby providing a flame spread barrier between the environments.

11 Claims, 6 Drawing Figures

SEALING APPARATUS INCLUDING PLIABLE CABLE WRAPPING WITH UPPER AND LOWER SEAL MEANS

RELATED APPLICATIONS

This application is a continuation-in-part application of patent application Ser. No. 430,785 filed Sept. 30, 1982 entitled Sealing Apparatus, now abandoned, Robert M. Kofoed, Sr., inventor.

BACKGROUND OF THE INVENTION

This invention relates generally to sealing apparatus and more particularly to sealing apparatus for surrounding a portion of a cable extending through and above an opening formed in a raised floor for supporting computer equipment and for providing a seal between the environment beneath the floor and the environment above the floor surrounding the computer equipment and further for providing a flame spread barrier between the environments.

As is known to those skilled in the computer equipment art, and more particularly the computer equipment environment art, most computer equipment is supported on a raised floor provided a predetermined distance above the base floor wherein the space between the raised and base floors can be used to run the cables connected to and interconnecting the various computer equipment and can be used as an air supply plenum. As is further known to those skilled in this art, the cables extend through openings formed in the floor and such cables in many instances can come into a state of disarray and entanglement providing a safety hazard making it desirable to compact the cables into a neat bundle thereby eliminating the safety hazard. In addition, as is further known, the environment above the raised floor surrounding the computer equipment can be filled with paper dust, other dust or dust particles, and other combustible matter which can provide a combustion hazard and upon such material passing from above through the openings formed in the raised floor through which the cables extend, such material can enter the environment beneath the raised floor providing a combustion hazard there and causing the inadvertent alarm of smoke detection typically present under the raised floor such as ionization and photoelectric smoke detection; accordingly, it is desirable to seal the environments above and below the raised floor from each other thereby eliminating the spread of flame between the two environments in the event of a fire in one of the environments.

SUMMARY OF THE INVENTION

The primary object of the present invention is to provide sealing apparatus for providing a seal between the above-mentioned environments and for providing a flame spread barrier between the environments in the event of fire; additionally, it is the object of the present invention to provide sealing apparatus which also compacts the cables extending through an opening formed in the raised floor into a compact bundle thereby eliminating a potential safety hazard.

Such objects are satisfied by the sealing apparatus of the present invention which includes a body of pliable material for being wrapped around a portion of a cable extending through an opening formed in a raised floor, a drawstring for being inserted into holes formed in the body of material and for being drawn tightly against and tied against a portion of the cable extending above the raised floor to provide a seal against the material and the cable and an expansion ring for being inserted into a passageway formed in the lower portion of the material which upon being compressed inwardly permits the ring and lower portion of the material to be inserted into the opening and which ring upon expanding outwardly wedges and seals the lower portion of the body of material against the floor surface forming the opening to seal the lower portion of the body of material against such surface, thus, a seal is provided between the environments above and below the raised floor. The body of material tightens the cable, or plurality of such cables, into a compact bundle and eliminates any safety hazard present were the cables to be loosely extending through the opening. In accordance with the present invention, the body of pliable material may be made of any one of several predetermined flame retardant materials whereby a flame spread barrier is provided between the environments.

DETAILED DESCRIPTION OF THE INVENTION

Figure 1:
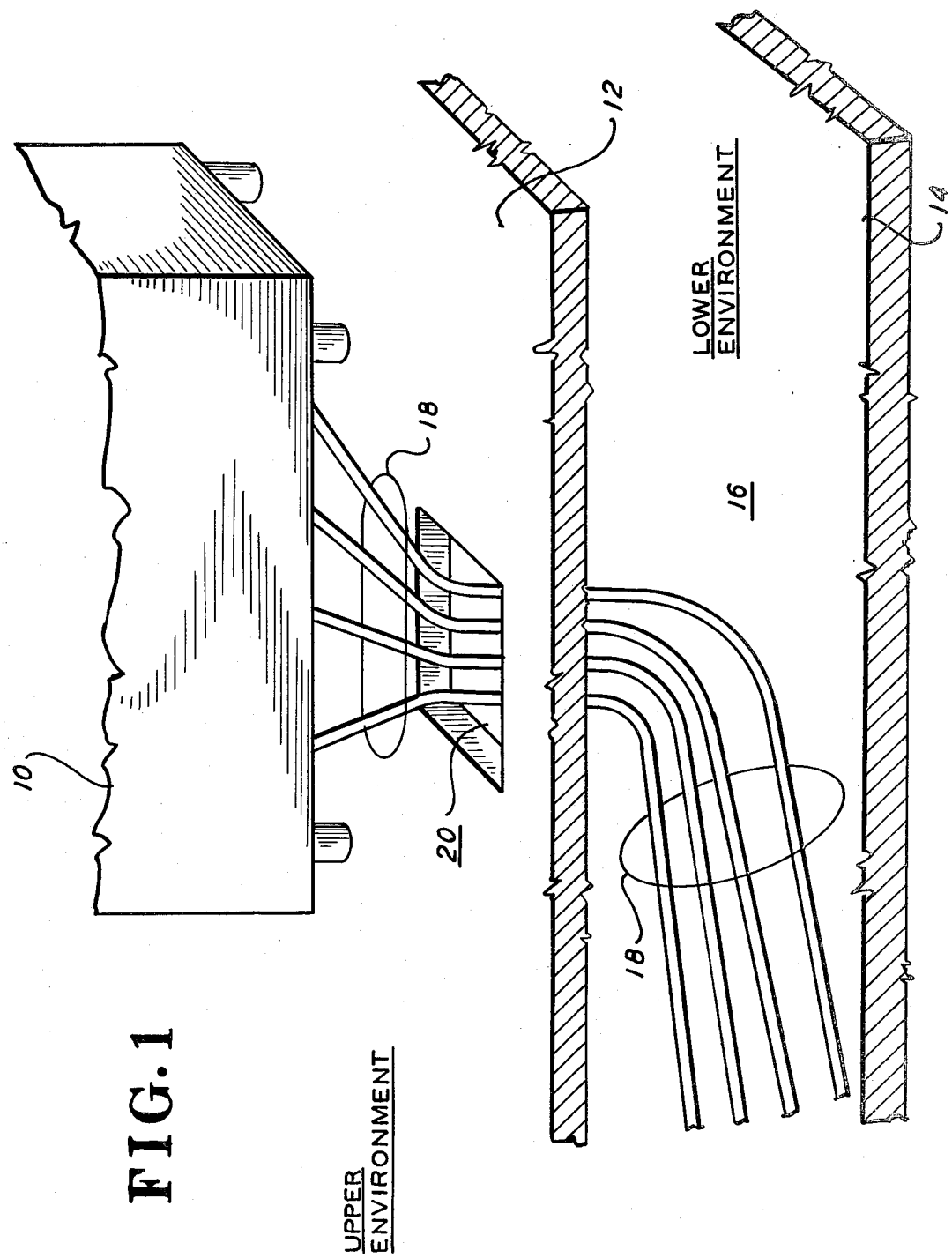
FIG. 1 is a diagrammatic illustration showing a typical setting for the sealing apparatus of the present invention.

FIG. 1 illustrates diagrammatically a portion of a computer equipment room including representative computer equipment 10 supported on a raised floor 12 provided above a base floor 14 whereby a space 16 is provided for receiving computer connecting and interconnecting cables indicated generally by numerical designation 18. It will be understood that in the specification and appended claims the term "cable" is used in both the singular and plural sense and is used to connote a single cable as well as a plurality of cables or wires or combinations thereof, etc.

An opening 20 is provided in the raised floor 12 to permit the cable 18 to extend therethrough and to be connected to the computer equipment 10. Due to the existence of the raised floor 12, an upper environment extends above the raised floor surrounding the computer equipment 10 and a lower environment extends beneath the raised floor occupying the space 16.

Figure 2:
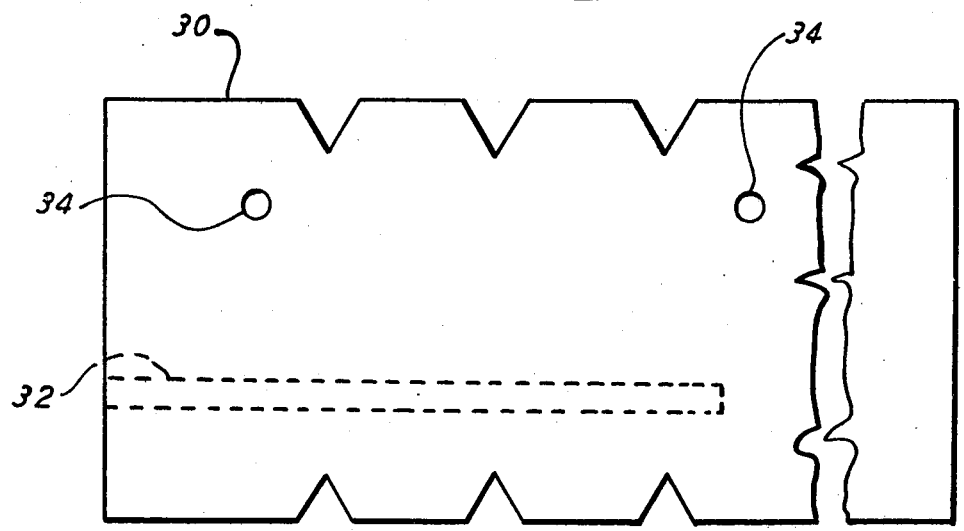
FIG. 2 is a plan view of a body of pliable material comprising the present invention.

Referring now to FIG. 2, there is shown a body of pliable material 30 for being wrapped around a portion of the cable extending through and above the opening 20 (FIG. 1); and to provide a flame spread barrier between the upper and lower environments illustrated in FIG. 1, the body of material 30 may be any one of several flame resistant or flame retardant materials known to those skilled in the art and, for example, may be the fiberglass fabric laminated to aluminum foil provided by the Alpha Associates, Inc. of Woodbridge, N.J. and sold under the tradename ALPHA- MARITEX Style #1925. The lower portion of the body of material 30 may be provided with a passageway, channel or loop 32 shown in dashed outline in FIG. 2 which passageway may be formed by any one of several well-known methods known to the art such as by stitching one layer of material to another or by stitching two layers of laminated material and providing an opening in the stitched area. The passageway 32 is for receiving an expansion ring, such as the circular ring 37 of FIG. 3 or the rectangular ring 38 of FIG. 4. In addition, the body of material 30 of FIG. 2 is provided in its upper portion with a plurality of holes 34 for receiving a drawstring (the drawstring 40 is shown diagrammatically in FIG. 5) and it will be understood that such drawstring may be made of any one of several known flame-resistant or retardant materials known to the art such as fiberglass.

Figure 3:
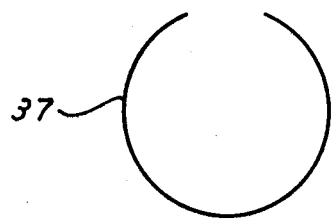
FIGS. 3 and 4 are alternate embodiments of rings, expansion rings, comprising the present invention.
Figure 4:
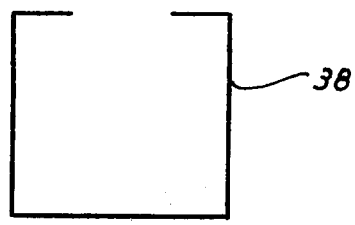

Referring particularly to the rings, expansion rings, shown in FIGS. 3 and 4, it will be understood by those skilled in the art that the opening 20 (FIG. 1) may be of several different shapes, rectangular as shown in FIG. 1, or circular whereby a circular ring such as shown in FIG. 3 would be used and, should the opening 20 formed in the raised floor 12 be of different configurations, it will be understood that the ring will be accordingly of complementary shape or configuration.

Figure 5:
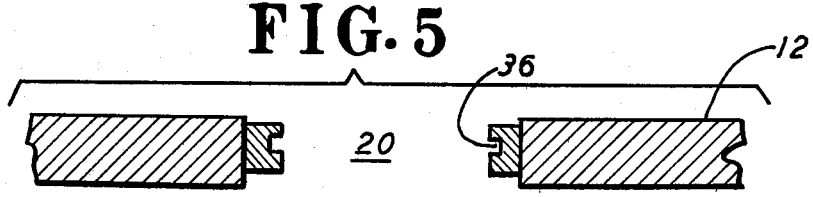
FIG. 5 is a partial cross-sectional view illustrating a side view of a raised floor of a computer equipment room.

Referring now to FIG. 5, it will be understood that in some installations the surface of the raised floor providing the opening 20 of FIG. 1 may also be provided with an insert providing a channel or groove 36 for receiving the expansion ring.

Figure 6:
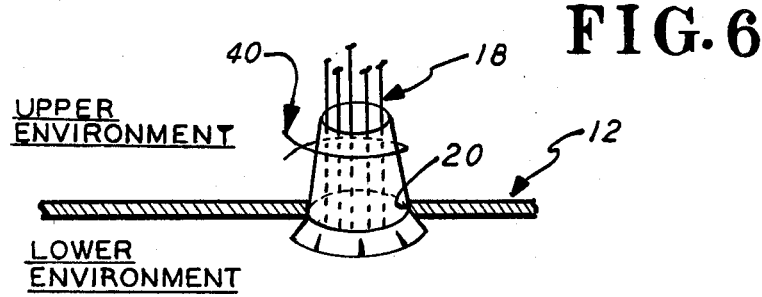
FIG. 6 is a diagrammatic illustration of the sealing apparatus of the present invention in place.

Referring now to the operation and installation of the sealing apparatus comprising the present invention, upon the drawstring 40 (FIG. 6) being inserted into a plurality of holes 34, and upon an expansion ring, e.g. rectangular expansion ring 38 of FIG. 4 complementary in shape to the rectangular opening 21 of FIG. 1, being inserted into the passageway 32, the body of pliable material 30 is wrapped around a portion of the cable 18 extending through and above the opening 20 formed in the raised floor whereupon the compression ring is compressed inwardly to permit the lower portion of the body of material 30 provided with the passageway 32 and the ring to be inserted into the opening 20 whereupon the ring is permitted to expand outwardly to wedge and seal the lower portion of the body of material 30 against the floor surface providing the opening 20 and then the drawstring 40 is drawn tightly against and tied around the cable 18 to seal the upper portion of the material against the cable whereby a seal is provided between the upper environment above the raised floor 12 and the lower environment below the raised floor 12.

It will be understood that upon being in place, the sealing apparatus of the present invention compacts the cable 18 into a compact bundle, and upon being of a predetermined flame spread barrier material, provides a flame barrier between the upper and lower environments and provides a seal between such environments.

While the sealing apparatus of the present invention has been taught in the context of apparatus for sealing off the environment above and below a raised floor in a computer equipment room, it is not so limited and can be used for many other sealing purposes such as for example to seal off environments existing on either side of a wall having an opening through which cables or other generally longitudinal members extend.

Further, it will be understood that the sealing apparatus of the present invention can be of any size so as to fit the various sizes of openings found in, e.g. raised floors in computer equipment rooms.

Still further, it will be understood by those skilled in the art that it is within the contemplation of the present invention to use apparatus other than the drawstring 40 to tightly draw or constrict the upper portion of the seal material around the cable to provide the seal between the upper environment above the raised floor and the lower environment below the raised floor. Such alternate apparatus instead of the drawstring 40 may include a Velcro strap, mechanical snaps such as found on canvas used in various places, for example a sailboat, etc., or a zipper or other equivalent constricting apparatus.

It will be further understood by those skilled in the art that many variations and modifications may be made in the present invention without departing from the spirit and the scope thereof.

What is claimed is:

1. Sealing apparatus for surrounding a portion of a generally longitudinally extending member extending through and beyond an opening formed in a member and for providing a seal between the environment on one side of said member and the environment on the other side of said member, said opening of a predetermined shape and provided by a member surface, comprising:

a body of pliable predetermined material for being wrapped around said portion of said generally longitudinally extending member extending through and beyond said opening;

a drawstring;

an expansion ring complementary in shape to said predetermined shape;

said material provided with a passageway extending along the lower portion thereof for receiving said ring and provided with a plurality of holes along the upper portion thereof for receiving said drawstring; and upon said drawstring and said ring being inserted into said holes in said passageway, respectively, and upon said material being wrapped around said predetermined length of said generally longitudinally extending member, said ring for being compressed inwardly to permit the lower portion of said material provided with said passageway and said ring to be inserted into said opening whereupon said ring is for expanding outwardly to wedge and seal the lower portion of the material against said member surface providing said opening, and said drawstring for being drawn tightly against and tied around said generally longitudinally extending member to seal the upper portion of the material against said generally longitudinally extending member whereby said seal is provided between said environments.

2. Sealing apparatus for surrounding a portion of a cable extending through the above an opening formed in a raised floor for supporting computer equipment and for providing a seal between the environment beneath said floor and the environment above said floor surrounding said computer equipment, said opening of a predetermined shape and provided by a floor surface, comprising:

a body of pliable predetermined material for being wrapped around said portion of said cable extending through and above said opening;

a drawstring;

an expansion ring complementary in shape to said predetermined shape;

said material provided with a passageway extending along the lower portion thereof for receiving said ring and provided with a plurality of holes along the upper portion thereof for receiving said drawstring; and upon said drawstring and said ring being inserted into said holes and said passageway, respectively, and upon said material being wrapped around said predetermined length of said cable, said ring for being compressed inwardly to permit the lower portion of said material provided with said passageway and said ring to be inserted into said opening whereupon said ring is for expanding outwardly to wedge and seal the lower portion of said material against said floor surface providing said opening, and said drawstring for being drawn tightly against and tied around said cable to seal the upper portion of said material against said cable whereby said seal is provided between said environments.

3. Apparatus according to claim 1 or 2 wherein said pliable predetermined material is a predetermined incombustible material for providing a flame spread barrier between said environments.

4. Apparatus according to claim 1 or 2 wherein the lower edge portion of said predetermined material is provided with a plurality of generally V-shaped inwardly extending notches for enhancing the ability of said ring and the lower portion of said material to conform to said predetermined shape of said opening.

5. Apparatus according to claim 1 or 2 wherein the upper portion of said material is provided with a plurality of generally V-shaped inwardly extending notches to enhance the ability of the upper portion of said material to conform to the shape of said generally longitudinally extending member or said cable.

6. Sealing apparatus for surrounding a portion of a generally longitudianlly extending member extending through and beyond an opening formed in a member and for providing a seal between the environment on one side of said member and the environment on the other side of said member, said opening of a predetermined shape and provided by a member surface, comprising:

a body of pliable predetermined material for being wrapped around said portion of said generally longitudinally extending member extending through and beyond said opening;

constricting means;

expansion means; and upon said material being wrapped around said predetermined length of said generally longitudinally extending member, said expansion means for expanding the lower portion of said material outwardly to wedge and seal the lower portion of the material against said member surface providing said opening, and said constricting means for constricting the upper portion of said material tightly against said generally longitudinally extending member to seal the upper portion of the material against said generally longitudinally extending member whereby said seal is provided between said environments.

7. Sealing apparatus for surrounding a portion of a cable extending through and above an opening formed in a raised floor for supporting computer equipment and for providing a seal between the environment beneath said floor and the environment above said floor surrounding said computer equipment, said opening of a predetermined shape and provided by a floor surface, comprising:

a body of pliable predetermined material for being wrapped around said portion of said cable extending through and above said opening;

constricting means;

expansion means; and upon said material being wrapped around said predetermined length of said cable, said expansion means for expanding the lower portion of said material outwardly to wedge and seal the lower portion of said material against said floor surface providing said opening, and said constricting means for constricting the upper portion of said material tightly against said cable whereby said seal is provided between said environments.

8. Sealing apparatus according to claim 7 wherein said constricting means is a Velcro strap.

9. Sealing apparatus according to claim 7 wherein said constricting means is a mechanical snap.

10. Sealing apparatus according to claim 7 wherein said constricting means is a zipper.

11. Sealing apparatus for surrounding a portion of a cable extending through and above an opening formed in a raised floor for supporting computer equipment and for providing a seal between the environment beneath said floor and the environment above said floor surrounding said computer equipment, said opening of a predetermined shape and provided by a floor surface, comprising:

a body of pliable predetermined material for being wrapped around said portion of said cable extending through and above said opening;

first sealing means for sealing the upper portion of said material against said portion of said cable extending through and above said floor opening; and second sealing means for sealing the lower portion of said material against said floor adjacent said opening whereby said seal is provided between said environments.

* * * * *